United States Patent
Choukir et al.

(10) Patent No.: US 11,140,043 B2
(45) Date of Patent: Oct. 5, 2021

(54) WIRELESS CLIENT ONBOARDING AND SEGMENTATION

(71) Applicant: Cisco Technology Inc., San Jose, CA (US)

(72) Inventors: Amine Choukir, Lausanne (CH);
Roberto Muccifora, Ropraz (CH);
Antonio Trifilo, Pully (CH); Domenico Ficara, Essertines-sur-Yverdon (CH);
Vincent Cuissard, Eteaux (FR);
Salvatore Valenza, Pomy (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 78 days.

(21) Appl. No.: 16/576,387

(22) Filed: Sep. 19, 2019

(65) Prior Publication Data

US 2021/0092021 A1    Mar. 25, 2021

(51) Int. Cl.
*H04L 12/24* (2006.01)
*H04W 12/06* (2021.01)
(Continued)

(52) U.S. Cl.
CPC .......... *H04L 41/12* (2013.01); *H04L 61/2015* (2013.01); *H04W 12/06* (2013.01); *H04W 84/12* (2013.01)

(58) Field of Classification Search
CPC .... H04L 41/12; H04L 61/2015; H04W 12/06; H04W 84/12
See application file for complete search history.

(56) References Cited

U.S. PATENT DOCUMENTS

| 7,735,114 B2 | 6/2010 | Kwan et al. |
| 2017/0373936 A1* | 12/2017 | Hooda ............... H04L 63/08 |

(Continued)

FOREIGN PATENT DOCUMENTS

| KR | 2019 0001138 A | 1/2019 |
| WO | 2019 089164 A1 | 5/2019 |

OTHER PUBLICATIONS

"Barrier Free Internet Access; Evaluating the Cyber Security Risk Posed by the Adoption of Bring Your Own Devices to e-Learning Network Infrastructure," E. T. Tchao, R. Y. Ansah, S. D. Kotey, International Journal of Computer Applications—Oct. 2017.

(Continued)

*Primary Examiner* — Duc C Ho
(74) *Attorney, Agent, or Firm* — Baker Botts, LLP

(57) ABSTRACT

A method is provided in a wireless local area network controller in a wireless communication network. The wireless communication network includes one or more virtual networks identified with virtual network IDs, VNIDs. A request is received from a wireless client to onboard onto the network and the wireless client is mapped to an onboarding VNID. The onboarding VNID is associated with an onboarding virtual network that does not require an authentication of the wireless client. An Internet Protocol address assignment is forwarded to the wireless client. The wireless client is remapped from the onboarding VNID to the destination VNID after authenticating the wireless client. The wireless client maintains the assigned IP address after moving from the onboarding VNID to the destination VNID. Access to the wireless client on a virtual network identified by the destination VNID is provided via the assigned IP address.

20 Claims, 4 Drawing Sheets

(51) Int. Cl.
*H04L 29/12* (2006.01)
*H04W 84/12* (2009.01)

(56) References Cited

U.S. PATENT DOCUMENTS

2020/0092251 A1* 3/2020 Peterson ............... H04L 61/103
2020/0374700 A1* 11/2020 Smith ................... H04L 9/3247
2020/0389426 A1* 12/2020 Enguehard ............ H04L 63/164

OTHER PUBLICATIONS

"Internet Protocol Version 6 Prefix Coloring in Software Defined Access Fabric for Differentiated Policy Enforcement," S. Gundavell, S. Murthy, S. Jain, I. Gandhi, Technical Disclosure Commons—Dec. 11, 2018.

* cited by examiner

WIRELESS CLIENT ONBOARDING AND SEGMENTATION

TECHNICAL FIELD

Certain embodiments of the present disclosure relate, in general, to wireless communications systems, and, in particular, to onboarding wireless clients.

BACKGROUND

Onboarding is a process in which a wireless client, e.g., a wireless device such as a mobile phone, laptop, etc., connects to a wireless network for the first time (or if its configuration information cannot be located by the network). During onboarding, the wireless client may be associated with a base virtual local area network (VLAN) associated with the service set identifier (SSID) identifying the wireless network. The wireless client may obtain an Internet Protocol (IP) address that can be used to authenticate the wireless client. After authentication, the wireless client may change VLANs based on the type of services or policies that need to be applied. For example, a business may have different sets of services or policies that apply to different types of employees, contractors, and guests. Authentication may confirm which VLAN, which may be defined by a set of services and/or policies, the wireless client should use. In this manner, a wireless client may be onboarded onto a wireless network.

BRIEF DESCRIPTION OF THE DRAWINGS

For a more complete understanding of the disclosed embodiments and their features and advantages, reference is now made to the following description, taken in conjunction with the accompanying drawings, in which.

DESCRIPTION OF EXAMPLE EMBODIMENTS

Overview

Figure 1:
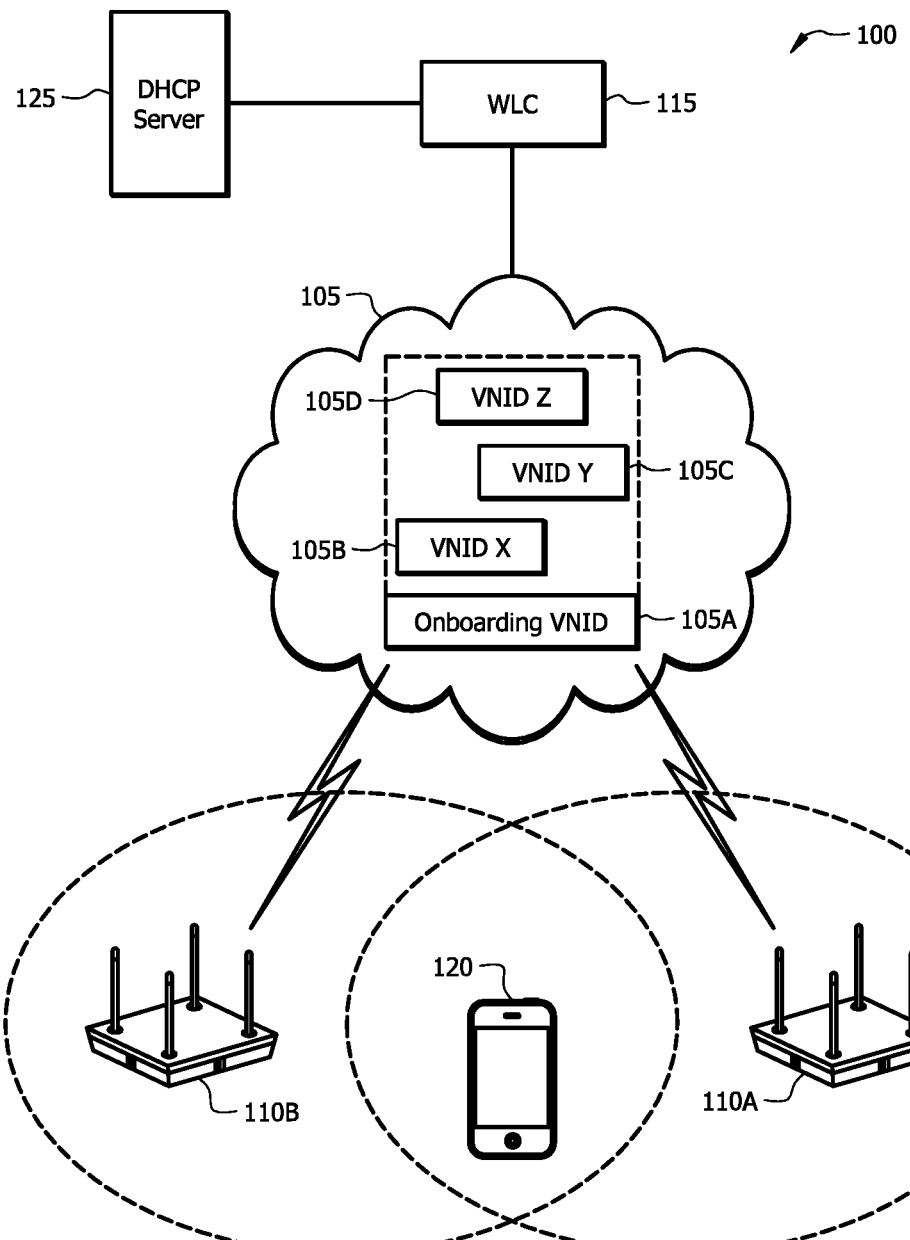
FIG. 1 illustrates an example network including a wireless LAN controller, in accordance with certain embodiments.

According to an embodiment, a method is provided in a wireless local area network, LAN, controller in a wireless communication network. The wireless communication network includes one or more virtual networks, each virtual network identified with a virtual network ID, VNID. The method includes receiving a request from a wireless client to onboard onto the wireless communication network. The method further includes mapping the wireless client to an onboarding VNID. The onboarding VNID is associated with an onboarding virtual network that does not require an authentication of the wireless client. The method further includes forwarding an Internet Protocol, IP, address assignment to the wireless client associated with the onboarding virtual network. The method further includes determining a destination VNID after authenticating the wireless client. The destination VNID is different from the onboarding VNID. The method further includes remapping the wireless client from the onboarding VNID to the destination VNID. The wireless client maintains the assigned IP address after moving from the onboarding VNID to the destination VNID. The method further includes providing access to the wireless client on a virtual network identified by the destination VNID via the assigned IP address.

As described in detail herein, one or more embodiments provided in this disclosure may include one or more technical advantages or solutions to existing technical problems. As one example, certain embodiments prevent the waste of wireless resources by minimizing redundant processing through methods and systems that preserve the IP address assigned to an onboarding wireless client as it changes virtual networks (VNIDs). For example, preserving the IP address prevents the wireless client from procuring a new IP address after switching virtual networks, e.g., after authentication using a previously learned IP for a different virtual network. Additionally, certain embodiments, enable the wireless client to retain its connection to the network even when switching between virtual networks. In this manner, the onboarding process becomes seamless and more resource efficient. Certain embodiments may have none, some, or all of the above-recited advantages. Other advantages may be readily apparent to one having skill in the art in light of the present disclosure.

Example Embodiments

Embodiments of the present disclosure and their advantages are best understood by referring to FIGS. 1 through 5 of the drawings, like numerals being used for corresponding parts of the various drawings. Although certain embodiments may be described in reference to particular illustrated examples, the disclosure herein is not limited to the particular illustrated embodiments and/or configurations and includes any and all variants of the illustrated embodiments and any and all systems, methods, or apparatuses consistent with the teachings of this disclosure, as understood by a person having ordinary skill in the art.

There are certain challenges and shortcomings of existing techniques of onboarding wireless clients. Conventional techniques rely on overriding or changing the virtual local area network (VLAN) for the wireless client after web authentication, which is both resource intensive and brittle from the perspective of a wireless client. In particular, such techniques typically require disassociating the wireless client from the service set identifier (SSID) (e.g., the network or portion of the network) during the VLAN changeover process.

For example, according to certain conventional methods, the wireless client is disassociated from the SSID after the web authentication during the reassignment of the new VLAN. The wireless client may then attempt to associate back to the same SSID and land on the VLAN. Thereafter, the wireless client may perform a process to obtain an Internet protocol (IP) address (that may be different from the IP address assigned for web authentication). For example, the wireless device may perform the IP LEARN process (e.g., via a dynamic host configuration protocol (DHCP) request) on the new VLAN and because the wireless device is already authenticated, the wireless device may skip web authentication and proceed directly to a RUN state.

The above-described process may have several weak points. In particular, once the wireless client is disassociated with the SSID, there is no guarantee that the wireless client will rejoin the same access point or even the same SSID. Indeed, some wireless clients are configured to remove the SSID from a preferred list upon disassociation and join a new SSID, which may prevent onboarding and joining the new VLAN or require redundant processes of IP assignment and web authentication.

As another example, the wireless client may keep the same SSID, but move to a new access point, thereby creating an unnecessary roaming situation that may require reauthentication in addition to relearning (or learning a new) IP address. In this manner, conventional onboarding techniques may result in duplicative signaling and processing by the wireless client and the network.

Other conventional or known techniques may have similar or different shortcomings. For example, certain onboarding techniques may attempt to keep the wireless client associated with the SSID, but configure a short DHCP lease timeout for the IP addresses in the original (base) VLAN associated with the SSID. When the VLAN changes post-web authentication, the wireless client acquires an IP on the subnet associated with the new VLAN upon lease timeout. Although this techniques does not involve disassociating the wireless client from the SSID, it is dependent on the particular DHCP server Lease Timeout implementation as well as the minimum lease timeout value (typically on the order of one minute). In addition, a time window exists where the wireless client has no connectivity, which defeats the goal of a seamless onboarding process.

Described herein are solutions addressing one or more of the technical problems identified above. For example certain embodiments described herein improve the onboarding process by employing virtual networks and fabric topologies to enable onboarding without disassociating the service set identifier (SSID) and retaining an assigned IP address as the onboarding wireless client is authenticated and moved to its assigned virtual network. For simplicity, FIG. 1 illustrates wireless network 100 with network 105 that may define one or more virtual networks including virtual networks identified by onboarding VNID 105A, VNID X 105B, VNID Y 105C, and VNID Z 105D.

Network 105 may transmit data via one or more wireless APs 110A and 110B, which may be controlled by wireless LAN controller (WLC) 115. Network 110 may also include Dynamic Host Configuration Protocol (DHCP) server 125 that is configured to provide and assign IP addresses, default gateways and other network parameters to wireless clients, such as wireless client 120.

In practice, a wireless network may further include any additional elements suitable to support communication between wireless devices, access points, and/or applications, or between a wireless device, access point, and/or application and another communication device, such as a landline telephone, a service provider, or any other network node or end device. Wireless network 100 may provide communication and other types of services to one or more wireless devices to facilitate the wireless devices' or access point's access to and/or use of the services provided by, or via, the wireless network.

Wireless client 120 may be onboarded onto network 105 via one of AP 110A or AP 110B. For example, wireless client 120 may send a signal on network 100 to connect to network 105. In response, WLC 115 may assign wireless client 120 to onboarding VNID 105A of network 105. Wireless client 120 may request an IP address assignment through network 105, which may involve signaling between wireless client 120 to DHCP server 125, e.g., via WLC 115 and AP 110A/B.

Once assigned an IP address, wireless client 120 may attempt to authenticate itself with network 105. Authentication allows wireless client 120 access to resources and services that are restricted on network 105 without authentication. For example, before authentication wireless client 120 may be limited to only the resources or connections necessary to authenticate wireless client 120, thereby preventing unauthorized access and limiting potential security vulnerabilities.

In certain embodiments, wireless client 120 may be authenticated via WLC 115 using its assigned IP address. For example, WLC 115 may authenticate wireless device 120 directly, or communicate with another system in wireless network 100 to confirm the identity or service/policy profile of wireless client 120 by the provided information, such as security credentials.

After authentication, wireless client 120 may be moved from onboarding VNID 105A to another VNID in network 105, such as VNID X. For example, the service/policy profile may indicate access to particular systems, connections, and/or resources and/or the application of one or more network policies, which are provided by assignment to a particular VNID. WLC 115 may determine which VNID to apply to wireless client 120 based on these characteristics and properties.

In certain embodiments, wireless device 120 retains its assigned IP address and uses the same IP address to communicate on network 105 in the new VNID. In contrast to conventional systems that require the disassociation of the SSID or the renewal of an IP address to move between different VLANs, the embodiments described herein facilitate retention of the same IP address through the onboarding process using virtual networks. In some embodiments, the assigned IP address is associated with the new VNID, e.g., using WLC 115, such that network 105 directs traffic to wireless client 120 using that IP address even after moving to the new VNID.

In some embodiments, AP 110A/B and/or WLC 115 is configured to perform network address translation (NAT) on the assigned IP address to a new IP address for the new VNID such that traffic on the new IP address is routed correctly to and from wireless client 120 using the assigned IP address. In this manner, the switchover of virtual networks does not interrupt the seamless onboarding process. Instead, wireless client 120 is provided with continuous connectivity as it onboards network 105 and is authenticated and gains access to network resources and systems.

In certain embodiments, WLC 115 and AP 110A/B may be integrated. For example, WLC 115 may be implemented on a portion of the hardware and/or software in AP 110A/B. In certain embodiments, WLC 115 is implemented separately from AP 110A/B and WLC 115 and AP 110A/B are communicatively coupled such that WLC 115 may interact with and control certain functions of AP 110A/B as understood by persons skilled in the art.

Wireless network 100 may comprise and/or interface with any type of communication, telecommunication, data, cellular, and/or radio network or other similar type of system. In some embodiments, wireless network 100 may be configured to operate according to specific standards or other types of predefined rules or procedures. Thus, particular embodiments of wireless network 100 may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Wireless network 100 and/or network 105 may further include one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices. In certain embodiments, wireless network 100 and/or network 105 may comprise any number of wired or wireless networks, network nodes, base stations, controllers, wireless devices, relay stations, and/or any other components or systems that may facilitate or participate in the communication of data and/or signals whether via wired or wireless connections.

As used herein, network 105 may include any equipment capable, configured, arranged and/or operable to communicate directly or indirectly with a wireless device, wireless access point and/or with other network nodes or equipment in the wireless network to enable and/or provide wireless access to the wireless device and/or to perform other functions (e.g., administration) in the wireless network. For example, network 105 may include an access point (APs) (e.g., radio access points or WiFi APs), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. Network node 105 may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, network 105 may include a virtual network node. More generally, however, network 105 may include any suitable device (or group of devices) capable, configured, arranged, and/or operable to enable and/or provide a wireless device with access to wireless network 100 or to provide some service to a wireless device, such as wireless client 120, that has accessed the wireless network.

Virtual networks implemented on network 105, such as onboarding VNID 105A, VNID X 105B, VNID Y 105C, and VNID Z 105D, may be any suitable virtual network defined by one or more network properties, such as one or more policies to apply to traffic on the virtual network and/or one or more services that are provided over the virtual network including access rules to particular systems and data over network 105. Virtual networks implemented on network 105 may be implemented in any suitable manner as recognized by persons of ordinary skill in the art. The disclosure herein may apply to any suitable configuration of network 105 with one or more virtual networks.

As used herein, WLC 115, AP 110A/B and/or wireless client 120 may include any device capable, configured, arranged and/or operable to communicate wirelessly with network nodes and/or other wireless devices. In certain embodiments, WLC 115, AP 110A/B and/or wireless client 120 includes a user equipment (UE) configured to communicate on an LTE or 5G NR network or a wireless access point configured to communicate according to one or more wireless standards, such as WiFi.

Communicating wirelessly may involve transmitting and/or receiving wireless signals using electromagnetic waves, radio waves, infrared waves, and/or other types of signals suitable for conveying information through air. In some embodiments, WLC 115, AP 110A/B and/or wireless client 120 may be configured to transmit and/or receive information without direct human interaction. For instance, WLC 115, AP 110A/B and/or wireless client 120 may be designed to transmit information to a network on a predetermined schedule, when triggered by an internal or external event, or in response to requests from the network. Examples of WLC 115, AP 110A/B and/or wireless client 120 include, but are not limited to, a wireless access point, a wireless router, a wireless repeater, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. or controllers thereof.

DHCP server 125 be any suitable hardware and/or software configured to provision IP addresses for communication on network 105. DHCP server 125 may be implemented in any suitable manner as may be understood by persons having ordinary skill in the art. In certain embodiments, DHCP server 125 is implemented together with one or more of WLC 115 and AP 110A/B. For example, DHCP server 125 may be implemented on hardware and/or software that is co-located with the hardware and/or software on which WLC 115 and/or AP 110A/B is implemented. In certain embodiments, DHCP server 125 is implemented separately from WLC 115 and/or AP 110A/B, e.g., at another location or on separate hardware and/or software. In certain embodiments, DHCP server 125 is configured to maintain assigned IP addresses across each virtual network of network 105. In this manner, DHCP server 125 may not assign an IP address to a second wireless client (not shown) being onboarded for onboarding VNID 105A if wireless client 120 was assigned the IP address, but has already moved from onboarding VNID 105A to one of VNID X, Y, or Z 105B-D.

Figure 2:
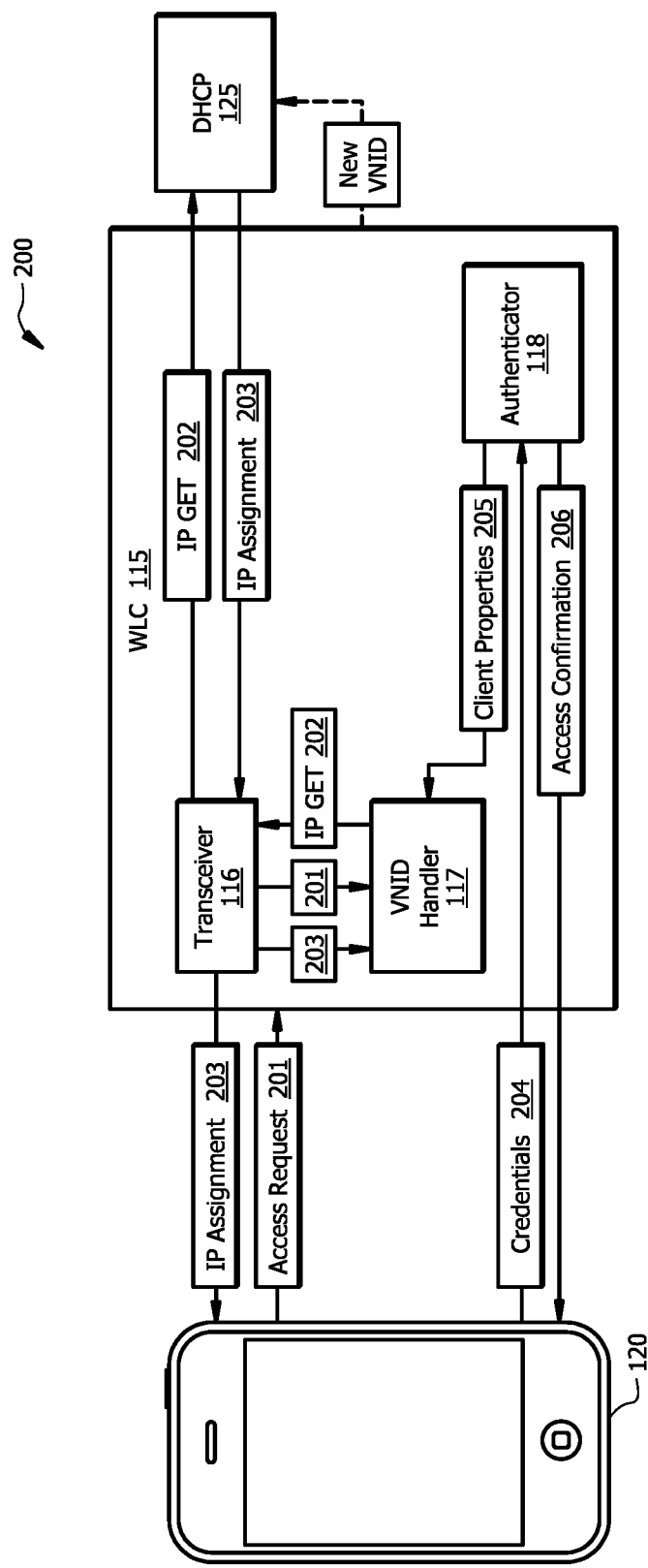
FIG. 2 illustrates the wireless LAN controller in a first configuration for onboarding a wireless client, in accordance with certain embodiments.

FIG. 2 illustrates wireless LAN controller 115 in a first configuration for onboarding wireless client 120, in accordance with certain embodiments. Although the described embodiments below referred to a WLC 115 that is combined with an access point, the disclosure is also applicable to situations where the wireless LAN controller is not combined with an access point serving wireless client 120. For example, certain functionality may be split between the wireless LAN controller and the access point and communicated information used to onboard wireless client may be communicated between the wireless LAN controller and the access point, e.g., via network 105 or via any other communication link.

WLC 115 includes one or more components configured to carry out particular functions of WLC 115 in the onboarding process and other related processes. In certain embodiments, WLC 115 includes a transceiver 116 configured to send and receive information between wireless client 120 and network 105. In certain embodiments, transceiver 116 is also configured to communicate with DHCP server 125, either directly or indirectly. In this manner, transceiver 116 may be used by WLC 115 to communicate and receive the necessary information to onboard wireless client 120.

In certain embodiments, WLC 115 may receive an access request 201 from wireless client 120. For example, wireless client 120 may transmit a signal to a detected network, e.g., network 105, which AP 110A and/or AP 110B provide access to. Access request 201 is forwarded to WLC 115 (either through further signaling on network 105 or internal communication within a combined AP/WLC device). In some embodiments, access request 201 is a series of back and forth communications between wireless client 120 and AP 110A/B and/or WLC 115. For the purposes of illustration, however, access request 201 is depicted as a single communication that is handled by WLC 115.

WLC 115 may further include a VNID handler 117. VNID handler 117 may be configured to determine which virtual network a wireless client is assigned to and can access. Additionally, VNID handler 117 may be configured to maintain which wireless clients are assigned to which VNIDs and what VNIDs are available on network 105. In certain embodiments, VNID handler 117 receives information indicating access request 201 or receives access request 201 itself. In response to access request 201, VNID handler 117 may assign wireless client 120 to a VNID defined for onboarding new wireless clients, e.g., onboarding VNID 105A. In this manner, wireless client 120 may be associated with onboarding VNID 117 to obtain an IP address and continue with authentication.

In certain embodiments, WLC 115 may facilitate the assignment of an IP address to wireless client 120 with DHCP server 125. For example, access request 201 may include an IP GET request 202 or WLC 115 may generate such a request in response to wireless client 120's assignment to onboarding VNID 105 by VNID handler 117. IP GET 202 is communicated to DHCP 125 and WLC 115 receives IP Assignment 203 in response from DHCP server 125. Although described as a single back-and-forth between WLC 115 and DHCP server 125, any suitable set of communications for obtaining an IP address from a DHCP server are contemplated herein. IP assignment 203 may be forwarded to wireless client 120 such that wireless client 120 may use IP assignment 203 to access network 105 on onboarding VNID 105A.

After wireless client 120 is assigned an IP address, it may attempt to authenticate itself using one or more credentials 204 that identifies an authorized user and/or class of users that have access privileges, such as access to particular systems, services, or connections and/or their traffic is subject to particular network policies.

In certain embodiments, WLC 115 may further include authenticator 118, which is configured to authenticate credentials 204 of wireless client 120. For example, authenticator 118 may compare credentials 204, e.g., a password and user name combination, biometric data, etc., to a profile. In certain embodiments, the authentication used by wireless client 120 is a level 3 web authentication. In some embodiments, the authentication is not carried out by WLC 115 alone, but in conjunction with other network systems, including servers storing one or more user profiles that can be compared to credentials 204 and include client properties 205 that define the services and/or policies that should be applied to wireless client 120.

When credentials 204 are determined to match a profile, e.g., credentials 204 are valid, authenticator 118 may confirm credentials 204 and communicate client properties 205 to VNID handler 117. Client properties 205 may define one or more services and/or policies that should be applied to wireless client 120 and any other information that may be used to identify or apply to wireless client 120, e.g., a type of wireless client 120 or the type of user using wireless client 120.

Using client properties 205, VNID handler 117 may be further configured to determine a VNID matching client properties 205. For example, VNID handler 117 may compare the services and/or policies identified in client properties 205 to existing VNIDs, such as VNID X 105B, and determine whether those services and/or policies are provided in one of the existing VNIDs. If no existing VNID matches or is compatible with client properties, VNID handler 117 or WLC 115 may be further configured, according to certain embodiments, to dynamically create a new virtual network and VNID based on client properties 205. Further details describing embodiments that include the dynamic creation of VNIDs by WLC 115 are provided below in reference to FIG. 4.

If an existing VNID matches client properties 205, VNID handler 117 may assign this destination VNID to wireless client 120. For example, VNID handler 117 may remove the association of wireless client 120 and/or its assigned IP address from onboarding VNID 105A and create a new association of wireless client 120 and/or its assigned IP address to the destination VNID, e.g., VNID X 105B.

In certain embodiments, WLC 115 may facilitate the changeover of the IP address to the destination VNID by communicating with DHCP server 125. For example, WLC 115 may indicate to DHCP server 125 that wireless device 120 has been moved to the destination VNID with the IP address assigned on onboarding VNID 105A. DHCP server 125 may be configured to abstain from assigning that IP address for onboarding VNID 105 for a second wireless client even though it is not currently used on that VNID (because wireless client 120 has already moved). In this manner, WLC 115 may coordinate with DHCP server 125 to prevent overlapping or conflicting IP address assignments even as wireless clients are moved between VNIDs.

According to another set of embodiments, WLC 115 is further configured to perform network address translation (NAT) after moving wireless client 120 to the destination VNID. For example, after wireless client 120 is authenticated and assigned the destination VNID (or VLAN), wireless client 120 may be assigned a second IP address for use on that destination VNID, which is obtained by WLC 115 (and/or AP 110A/B). Instead of changing the IP address at wireless client 120, which may interrupt connectivity, WLC may perform NAT translation from the assigned IP address used by wireless client 120 to the second IP address assigned for the destination VNID. For example, in some embodiments, traffic between wireless client 120 and VNID X 105B on network 105 is translated between the two IP addresses using NAT translation at WLC 115 or at AP 110A/B. In this manner, wireless client 120 may still retain its assigned IP address even when changing over virtual networks during the onboarding process.

After wireless client 120 is onboarded and moved to the destination VNID, WLC 115 may indicate to wireless client 120 that it can now access network resources for which it is authorized. This may include an access confirmation 206 sent to wireless client 120 from WLC 115. Accordingly, wireless client 120 may be informed about its onboarding status and whether it needs to resend information, such as credentials 204 to complete authentication, to complete onboarding. In this manner, WLC 115 enables an improved onboarding process for wireless client 120 that does not require the disassociation of an ID of network 105 nor the renewal or reassignment of an IP address. As a result, wireless client 120 may be onboarded without requiring resending or carrying out redundant processes and without time periods disconnected from network 105.

Figure 3:
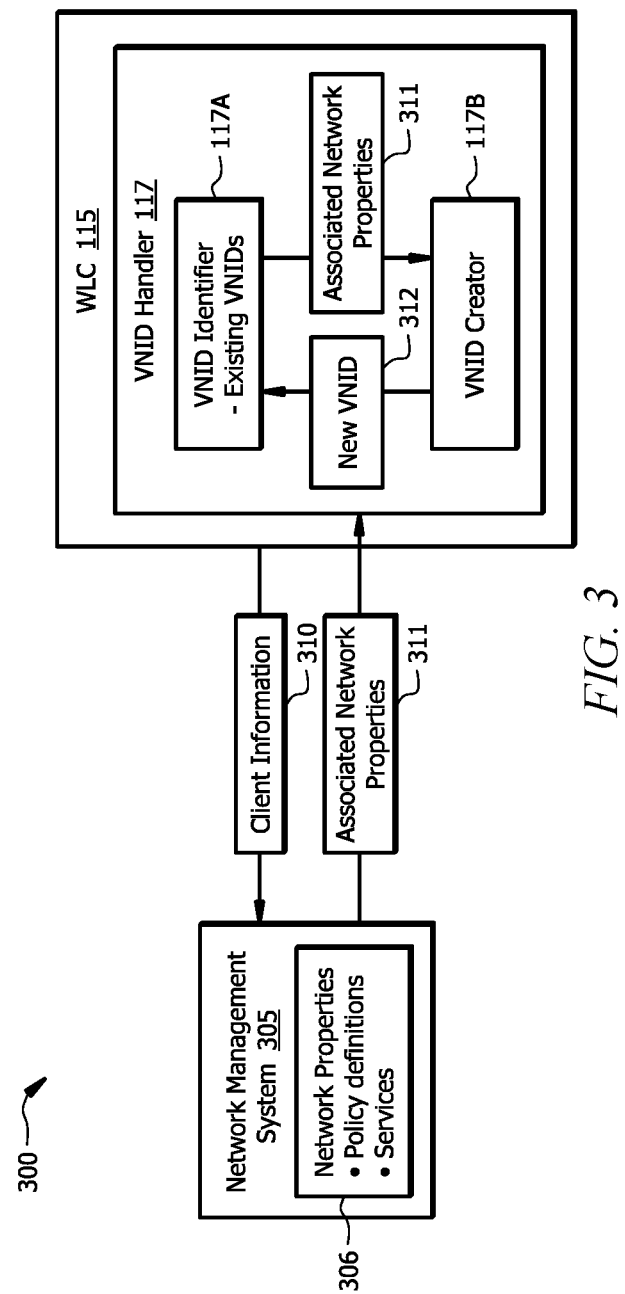
FIG. 3 illustrates the wireless LAN controller in a second configuration for dynamically handling virtual network IDs, in accordance with certain embodiments.

FIG. 3 illustrates the WLC 115 in a second configuration. In certain embodiments, WLC 115 is configured to dynamically maintain and create VNIDs. In particular, WLC 115 may be configured to coordinate with a network management system 305 to identify applicable network properties for an authenticated wireless client and assign a matching VNID to the wireless client or dynamically create a new VNID if no matching VNID exists. Network management system 305 may include one or more servers or systems that store network properties 306 that are applicable to particular users, groups of users, devices, or groups/types of devices on network 105. Network properties 306 may indicate policy definitions to apply to traffic to particular wireless clients and/or services that should be provided on network 105 to particular users/clients.

For example, VNID handler 117 of WLC 115 may include one or more subcomponents enabling WLC 115 to dynamically manage VNIDs. In certain embodiments, VNID handler 117 includes VNID identifier 117A and VNID creator 117B. VNID Identifier 117A may have stored in memory or have access to memory storing the existing VNIDs that have already been defined on network 105. The existing VNIDs may be defined by one or more network properties, such as which network services are provided on the VNID, what systems or nodes to which the VNID allows access, or any policies that is applied to traffic on the VNID, e.g., for accounting or profiling. In some embodiments, network properties may include one or more parameters defining a quality of service (QoS), traffic engineering settings, service chaining properties, access control properties, firewalls, authentication or authorization characteristics, or profiling.

In certain embodiments, WLC 115 may send client information 310 to network management system 305 to identify the network properties that should be applied to the wireless client, such as wireless client 120. For example, WLC 115 may identify wireless client 120 once authenticated via credentials 204 and/or other identifying information communicated during the onboarding process. The information may be included in client information 310 sent to network management system 305.

In response, network management system 305 may be configured to determine which of network properties 306 are applicable to wireless client 120 based on client information 310. In certain embodiments, this includes network management system 305 comparing client information 310 to client information associated with each network property or sets of properties in network properties 306. In some embodiments, this includes checking for any services defined for use for clients of the type identified in client information 310 or user identified in client information 310. In some embodiments, this includes checking for any policies applicable for clients of the type identified in client information 310 or user identified in client information 310. In some embodiments, network management system 305 may check multiple systems for policies and/or services that may be applicable, which may include forwarding client information 310 or a portion thereof to separate systems, which may respond with one or more applicable policy and/or service.

Accordingly, WLC 115 may obtain associated network properties 311 from network management system 305, which identifies one or more network properties that should be applied to wireless client 120 when accessing network 105. In certain embodiments, WLC 115 may use associated network properties 311 to dynamically handle VNIDs. In particular examples, VNID handler 117 of WLC 115 obtains associated network properties 311. VNID identifier 117A may compare the network properties in associated network properties 311 to the properties of existing VNIDs that have already been defined on network 105.

For example, VNID identifier 117A may determine if any existing VNID has the same (or each of or substantially all of) the network properties identified in associated network properties. If a matching existing VNID is found, VNID handler 117 may identified that matching VNID as the destination VNID, e.g., as described above, to which wireless client 120 may be switched over to from onboarding VNID 105A. In certain embodiments, an existing VNID is matching only if it has every policy and service indicated in associated client properties 311. In some embodiments, an existing VNID is considered matching if it includes each priority service and/or policy indicate in associated client properties 311. For example, some networks may not be configured for every available service and/or for implemented every possible policy. Accordingly, in certain embodiments, an existing VNID may be assigned even if there is not a one-to-one correspondence with associated network properties 311.

In certain embodiments, there is no matching existing VNID. In response, VNID identifier 117A may indicate to VNID creator 117B that there is no matching existing VNID and that a new VNID is required. Further, VNID creator 117B may obtain associated network properties 311, e.g., from VNID identifier 117A. Once obtaining this information, VNID creator 117B may define a new VNID 312 that satisfies the requirements of associated network properties 311. In some embodiments, this requires the provisioning or virtual provisioning of network resources on network 105.

After new VNID 312 is defined and created, it can be assigned to wireless client 120. For example, VNID handler 117 may have new VNID 312 added to the list of existing VNIDs 117A and associate wireless client 120 to new VNID 312 during the onboarding process, as discussed above. In this manner, new network policies and services may be deployed organically instead of relying on limited VNID building blocks. As a result, WLC 115 may be configured to dynamically create and manage VNIDs that can be used in onboarding wireless clients onto a wireless network.

Figure 4:
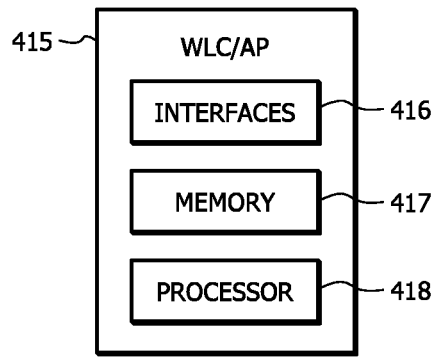
FIG. 4 illustrates a wireless LAN controller in a third configuration, in accordance with certain embodiments.

FIG. 4 illustrates a third configuration of a wireless LAN controller or wireless access point (WLC/AP) 415, according to certain embodiments. In certain embodiments, WLC 115 is configured in a like manner. WLC/AP 415 includes one or more interfaces 416, a memory 417 and a processor 418. WLC/AP 415 may include multiple sets of one or more of the illustrated components for different wireless technologies supported by WLC/AP 415, such as, for example, GSM, WCDMA, LTE, NR, WiFi, WiMAX, or Bluetooth wireless technologies, just to mention a few. These wireless technologies may be integrated into the same or different chips or set of chips as other components within WLC/AP 415.

Interfaces 416 may include one or more antennas or antenna arrays, configured to send and/or receive wireless signals. In certain alternative embodiments, interfaces 416 may not include an antenna, but may include an interface for interfacing with an external antenna connectable to WLC/AP 415 through one of interfaces 416. Interfaces 416 and/or processor 418 may be configured to perform any receiving or transmitting operations described herein as being performed by WLC/AP 415, respectively. Any information, data and/or signals may be received from a network node and/or another wireless node.

In certain embodiments, interfaces 416 includes one or more of radio front end circuitry and an antenna. For example, interfaces 416 may include one or more filters or amplifiers that is connected to transmission components. In some embodiments, interfaces 416 are configured to or receive analog or digital data that is sent out to other nodes or terminal devices via a wireless connection. In some embodiments, interfaces 416 may include circuitry configured to convert data from digital to analog and vice versa. Signals and data received may be passed to processor 418, respectively. Accordingly, interfaces 416 may include any suitable interfacing components for receiving and/or transmitting wireless communications.

In certain embodiments, interfaces 416 may also include one or more interfaces for communicating between different components of WLC/AP 415, including any components described in FIGS. 1-3 of WLC 115, such as transceiver 116, VNID handler 117, VNID identifier 117A, VNID creator 117B, and authenticator 118.

Processor 418 may include be any electronic circuitry, including, but not limited to microprocessors, application specific integrated circuits (ASIC), application specific instruction set processor (ASIP), and/or state machines, that communicatively couples to memory 417 respectively, and controls the operation of WLC/AP 415. Processor 418 may be 8-bit, 16-bit, 32-bit, 64-bit or of any other suitable architecture. Processor 418 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 418 may include other hardware and software that operates to control and process information.

Processor 418 executes software stored on memory 417, to perform any of the functions described herein. For example, processor 418 may control the operation and administration of WLC/AP 415 by processing information received from memory 417, or any external databases, or any other components of the wireless network in which it is deployed. In certain embodiments, processor 418 may be configured to carry out one or more functions of WLC 115, or any components thereof, such as transceiver 116, VNID handler 117, VNID identifier 117A, VNID creator 117B, and authenticator 118.

Processor 418 may be a programmable logic device, a microcontroller, a microprocessor, any suitable processing device, or any suitable combination of the preceding. Processor 418 is not limited to a single processing device and may encompass multiple processing devices. In certain embodiments, processor 418 includes one or more of wireless transceiver circuitry, wireless signal processing circuitry, and application processing circuitry. In other embodiments, the processor 418 may include different components and/or different combinations of components. In certain embodiments processor 418 includes a system on a chip. In some embodiments, processor 418 or components thereof may be on a single chip, separate chips, or a set of chips.

Memory 417 may store, either permanently or temporarily, data, operational software, or other information for processor 418. In certain embodiments, memory 417 may store information such as IP assignment 203, client properties 205, credentials 204, network properties 311, new VNID, existing VNIDSs, and any other information used in onboarding wireless clients, at WLC 115. Memory 417 may include any one or a combination of volatile or non-volatile local or remote devices suitable for storing information.

For example, memory 417 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 417, a disk, a CD, or a flash drive. Memory 417 may be operable to store a computer program, software, an application including one or more of logic, rules, code, tables, etc. and/or other instructions capable of being executed by processor 418. In particular embodiments, the software may include an application executable by processor 418 to perform one or more of the functions described herein. In certain embodiments, memory 417 may be or implemented as a NoSQL database. In some embodiments, processor 418 and memory 417 may be considered to be integrated.

In certain embodiments, some or all of the functionality described herein as being performed by WLC/AP 415 (and WLC 115) may be provided by processor 418, respectively, executing instructions stored on memory 417, respectively, which in certain embodiments may be a computer-readable storage medium. In alternative embodiments, some or all of the functionality may be provided by processor 418 without executing instructions stored on a separate or discrete device readable storage medium, such as in a hard-wired manner. In any of those particular embodiments, whether executing instructions stored on a device readable storage medium or not, processor 418 can be configured to perform the described functionality.

Processor 418 may be configured to perform any determining, calculating, or similar operations (e.g., certain obtaining operations) described herein as being performed by WLC/AP 415 (and WLC 115). These operations, as performed by processor 418, may include processing information obtained by processor 418 by, for example, converting the obtained information into other information, comparing the obtained information or converted information to information stored by WLC/AP 415 (and WLC 115), and/or performing one or more operations based on the obtained information or converted information, and as a result of said processing making a determination.

In particular embodiments, one or more functions described herein relating to WLC/AP 415 (and WLC 115) may be implemented using one or more interfaces 416, memory 417, and processor 418, their equivalents, or any suitable combination of hardware and software as understood by persons having skill in the art capable of carrying out one or more functions or methods described herein.

Figure 5:
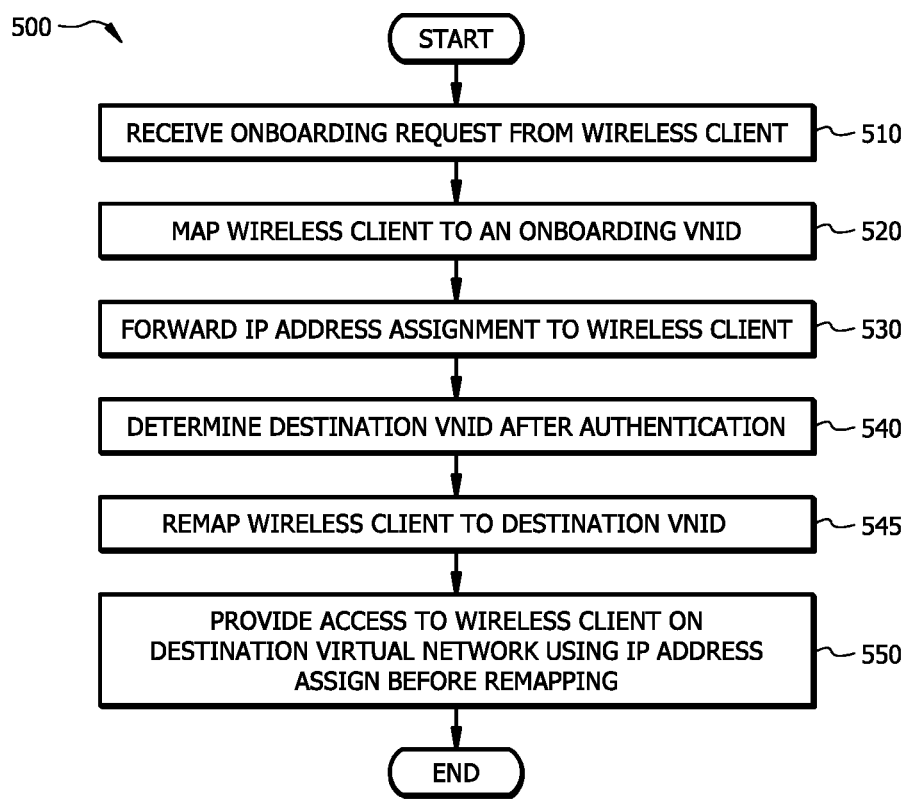
FIG. 5 is a flowchart diagram of an example method in a wireless LAN controller, in accordance with certain embodiments.

FIG. 5 is a flowchart diagram of an example method 500 in a wireless LAN controller and/or wireless access point, such as WLC 115 and/or WLC/AP 415, in accordance with certain embodiments. At step 510, an onboarding request may be received from a wireless client. For example, WLC 115 may receive signaling from wireless client 120 indicating a request to access network 105.

If the wireless client has not yet been onboarded, at step 520, the wireless client is mapped to an onboarding VNID. For example, an onboarding VNID, such as onboarding VNID 105A, may be defined to provide the necessary access on the network, e.g., network 105, to enable the wireless client to be authenticated and provide the necessary credentials to determine which network resources the wireless client should have access to. For example, VNID handler 117 of WLC 115 may map wireless client 120 to onboarding VNID 105A, as described herein.

At step 530, an IP address assignment is forwarded to the wireless client. For example, WLC 115 may coordinate with DHCP server 125 and wireless client 120 to obtain an IP address for wireless client 120 on onboarding VNID 105A. In certain embodiments, this includes one or more substeps, including receiving an IP GET request form the wireless client, forwarding the request to a DHCP server, receiving an IP address assignment, receiving a confirmation of the IP address assignment, and forwarding the confirmation to the DHCP server. Accordingly, the wireless client may be assigned an IP address that can be used to complete the onboarding process.

At step 540, a destination VNID is determined after the wireless client is authenticated. For example, the wireless client may complete an authentication process, e.g., a level 3 web authentication procedure, to authenticate the wireless client. Based on the authentication, a VNID is identified for the wireless client. For example, the authentication may indicate the destination VNID directly or may identify a set of network properties, e.g., policies and/or services, that the assigned network should satisfy for the wireless client. The destination VNID may be determined based on this information or in certain embodiments, dynamically created, as described herein. Accordingly, a destination VNID may be determined for use by the wireless client.

At step 550, the wireless client is remapped to the destination VNID. For example, WLC 115 remaps wireless client 120 to VNID X using VNID handler 117. In some embodiments, remapping the wireless client includes coordinating with the DHCP server to indicate the remapping and prevent the reassignment of the assigned IP address to a new wireless client on the onboarding VNID.

At step 560, the wireless client is provided access on the destination virtual network identified by the destination VNID using the IP address assigned before remapping. For example, traffic from the wireless client to the access point and/or wireless LAN controller may use the same IP address that was forwarded in step 530. In certain embodiments, the association of the assigned IP address is removed from the onboarding VNID and moved to the destination VNID so that the network knows that traffic from that IP address originates (or is destined for) the wireless client. In other embodiments, the access point and/or wireless LAN controller is configured to perform network access translation after moving the wireless client to the new virtual network. For example, a new IP address may be assigned for the destination VNID and WLC 115 is configured to translate the addresses for traffic from wireless client 120 to and from network 105 on the destination VNID. In this manner, the wireless client may be seamless onboarded on the wireless network without disruption of connectivity or duplication of processes in onboarding the wireless client.

Modifications, additions, or omissions may be made to method 500 depicted in FIG. 5. Method 500 may include more, fewer, or other steps. Additionally, steps may be performed in parallel or in any suitable order. While discussed as WLC 115 and/or WLC/AP 415 as performing certain steps, any suitable component WLC 115 and/or WLC/AP 415 may perform one or more steps of the methods. Additionally, method 500 may include any suitable step to carry out any of the described functions of WLC 115 and/or WLC/AP 415. Further, any steps of method 500 may computerized and/or carried out using hardware, such as processor 418 of WLC/AP 415, or any other suitable system implementing one or more components of WLC 115 and/or WLC/AP 415, such as any hardware or software implementing transceiver 116, VNID handler 117, VNID identifier 117A, VNID creator 117B, Authenticator 118, or DHCP server 125.

In addition, techniques, systems, subsystems, and methods described and illustrated in the various embodiments as discrete or separate may be combined or integrated with other systems, modules, techniques, or methods without departing from the scope of the present disclosure. Other items shown or described as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A method in a wireless local area network, LAN, controller in a wireless communication network comprising one or more virtual networks, wherein each virtual network is identified with a virtual network ID, VNID, the method comprising:
   receiving a request from a wireless client to onboard onto the wireless communication network;
   mapping the wireless client to an onboarding VNID, wherein the onboarding VNID is associated with an onboarding virtual network that does not require an authentication of the wireless client;
   forwarding an Internet Protocol, IP, address assignment to the wireless client associated with the onboarding virtual network;
   determining a destination VNID after authenticating the wireless client, wherein the destination VNID is different from the onboarding VNID;
   remapping the wireless client from the onboarding VNID to the destination VNID, wherein the wireless client maintains the assigned IP address after moving from the onboarding VNID to the destination VNID; and
   providing access to the wireless client on a virtual network identified by the destination VNID via the assigned IP address.

2. The method of claim 1, wherein the authentication of the wireless client is a level 3 web authentication of the wireless client using the assigned IP address.

3. The method of claim 1, further comprising:
   forwarding a request from the wireless device to obtain an IP address to a DHCP server;
   receiving, from the DHCP server, the IP address assignment; and
   binding the IP address assignment to the onboarding VNID.

4. The method of claim 3, further comprising:
   transferring the binding of the IP address assignment to the destination VNID after determining the destination VNID after authenticating the wireless client; and preventing, after the binding is transferred, the assignment of the IP address by the DHCP server for a second wireless client mapped to the onboarding VNID.

5. The method of claim 1, wherein determining the destination VNID after authenticating the wireless client comprises:
determining a set of network properties associated with the wireless client; and
identifying a VNID as the destination VNID that matches the set of network properties.

6. The method of claim 5, wherein determining the set of network properties associated with the wireless client comprises requesting the network properties from one or more network management systems using a property of the wireless client.

7. The method of claim 5, wherein identifying a VNID as the destination VNID that matches the set of network properties comprises;
determining whether an existing virtual network matches the set of network properties; and
upon determining no existing virtual network matches the set of network properties:
creating a new virtual network with a new VNID that includes each of the network properties in the set of network properties; and
identifying the new VNID of the new virtual network as the destination VNID.

8. The method of claim 5, wherein the set of network properties comprises one or more of a service to be available to the wireless client and a policy to apply to the wireless client.

9. A wireless local area network, LAN, controller in a wireless communication network comprising one or more virtual networks, wherein each virtual network is identified with a virtual network ID, VNID, the WLAN controller comprising:
a memory comprising instructions; and
a hardware processor;
wherein the WLAN controller, when executing the instructions at the hardware processor, is configured to:
receive a request from a wireless client to onboard onto the wireless communication network;
map the wireless client to an onboarding VNID, wherein the onboarding VNID is associated with an onboarding virtual network that does not require an authentication of the wireless client;
forward an Internet Protocol, IP, address assignment to the wireless client associated with the onboarding virtual network;
determine a destination VNID after authenticating the wireless client, wherein the destination VNID is different from the onboarding VNID;
remap the wireless client from the onboarding VNID to the destination VNID, wherein the wireless client maintains the assigned IP address after moving from the onboarding VNID to the destination VNID; and
provide access to the wireless client on a virtual network identified by the destination VNID via the assigned IP address.

10. The WLAN controller of claim 9, wherein the authentication of the wireless client is a level 3 web authentication of the wireless client using the assigned IP address.

11. The WLAN controller of claim 9, wherein the WLAN controller is further configured to:
forward a request from the wireless device to obtain an IP address to a DHCP server;
receive, from the DHCP server, the IP address assignment; and
bind the IP address assignment to the onboarding VNID.

12. The WLAN controller of claim 11, wherein the WLAN controller is further configured to:
transfer the binding of the IP address assignment to the destination VNID after determining the destination VNID after authenticating the wireless client; and
prevent, after the binding is transferred, the assignment of the IP address by the DHCP server for a second wireless client mapped to the onboarding VNID.

13. The method of claim 9, wherein the WLAN controller determining the destination VNID after authenticating the wireless client comprises:
determining a set of network properties associated with the wireless client; and
identifying a VNID as the destination VNID that matches the set of network properties.

14. The method of claim 13, wherein the WLAN controller determining the set of network properties associated with the wireless client comprises requesting the network properties from one or more network management systems using a property of the wireless client.

15. The method of claim 13, wherein the WLAN controller identifying a VNID as the destination VNID that matches the set of network properties comprises;
determining whether an existing virtual network matches the set of network properties; and
upon determining no existing virtual network matches the set of network properties:
creating a new virtual network with a new VNID that includes each of the network properties in the set of network properties; and
identifying the new VNID of the new virtual network as the destination VNID.

16. The method of claim 13, wherein the set of network properties comprises one or more of a service to be available to the wireless client and a policy to apply to the wireless client.

17. A method in a wireless client in a wireless communication network comprising one or more virtual networks, wherein each virtual network is identified with a virtual network ID, VNID, the method comprising:
communicating a request to a wireless access point to onboard onto the wireless communication network;
receiving an Internet Protocol, IP, address assignment associated with an onboarding virtual network configured on the wireless communication network;
using the IP address assignment to complete an authentication process; and
after completing the authentication process, accessing, using the received IP address assignment, the wireless communication network on a destination virtual network different from the onboarding virtual network.

18. The method of claim 17, wherein the authentication process is a level 3 web authentication completed by the wireless client using the assigned IP address.

19. A wireless client in a wireless communication network comprising one or more virtual networks, wherein each virtual network is identified with a virtual network ID, VNID, the wireless client comprising:
one or more interfaces configured to receive wireless transmissions;
a memory comprising instructions; and
a hardware processor;
wherein the wireless node, when executing the instructions at the hardware processor, is configured to:

communicate a request to a wireless access point to onboard onto the wireless communication network;

receive an Internet Protocol, IP, address assignment associated with an onboarding virtual network configured on the wireless communication network; and use the IP address assignment to complete an authentication process;

after completing the authentication process, access, using the received IP address assignment, the wireless communication network on a destination virtual network different from the onboarding virtual network.

20. The wireless client of claim 19, wherein the authentication process is a level 3 web authentication completed by the wireless client using the assigned IP address.

\* \* \* \* \*